March 10, 1925. Re. 16,022
W. FERRIS
ROPE THRUSTING SHOVEL
Original Filed Aug. 3, 1921 2 Sheets-Sheet 1
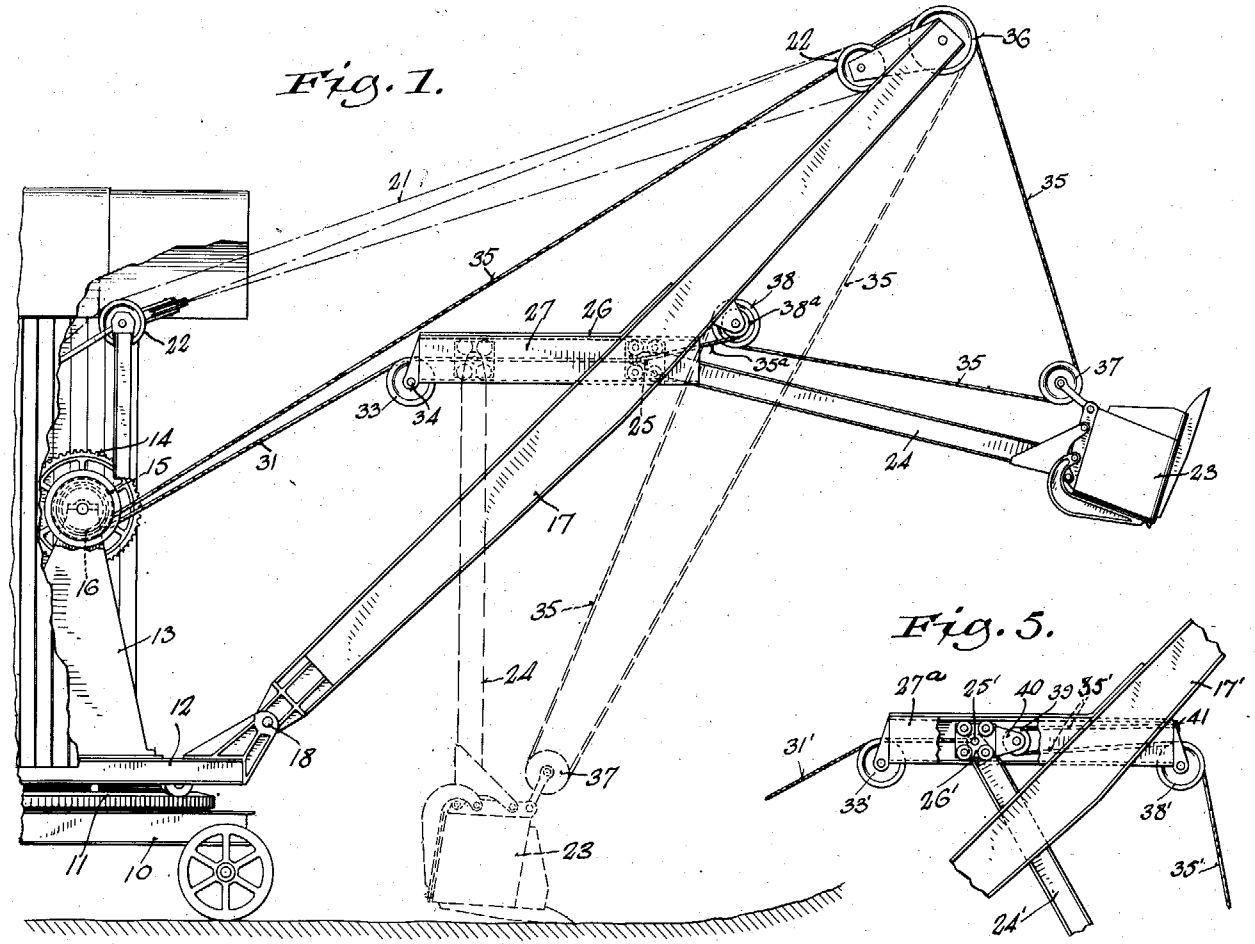
INVENTOR.
WALTER FERRIS:
BY
Ralph W. Brown.
ATTORNEY.

March 10, 1925.

Re. 16,022

W. FERRIS

ROPE THRUSTING SHOVEL

Original Filed Aug. 3, 1921 2 Sheets-Sheet 2

INVENTOR.
WALTER FERRIS:

BY

Ralph W. Brown.
ATTORNEY.

Reissued Mar. 10, 1925. Re. 16,022

UNITED STATES PATENT OFFICE.

WALTER FERRIS, OF MILWAUKEE, WISCONSIN, ASSIGNOR TO BUCYRUS COMPANY, OF SOUTH MILWAUKEE, WISCONSIN, A CORPORATION OF WISCONSIN.

ROPE-THRUSTING SHOVEL.

Original No. 1,443,353, dated January 30, 1923, Serial No. 489,407, filed August 3, 1921. Application for reissue filed October 4, 1924. Serial No. 741,774.

*To all whom it may concern:*

Be it known that I, WALTER FERRIS, a citizen of the United States, residing at Milwaukee, in the county of Milwaukee and State of Wisconsin, have invented a certain new and useful Improvement in Rope-Thrusting Shovels, of which the following is a full, clear, concise, and exact description, reference being had to the accompanying drawings, forming a part of this specification.

This invention relates to power excavators, and more particularly, to power shovels of that type in which the dipper handle is mounted upon an adjustable pivot movable with respect to the boom.

The general aim of the present invention is the provision of a simple and improved device for effecting and controlling the movement of the pivotal support for the dipper handle.

A more specific object is the provision of a simple and improved form of dipper shifting device, capable of advantageous use in this type of shovel irrespective of the character of prime mover with which the shovel may be provided.

Another object is the provision of a novel arrangement of parts, whereby the working tension in the dipper hoisting cable may be utilized in effecting a shifting movement of the pivotal support for the dipper handle.

Another object is the provision of an improved dipper shifting device in which a single cable associated with the prime mover may be employed for effecting a shifting of the dipper handle independently of the hoisting action of the hoist gear.

Another object is the provision of a dipper shifting device that may be operated and controlled from the hoisting and dragline drums, such as are ordinarily provided in certain types of power excavators.

Other objects and advantages will later appear.

Two embodiments of the invention are illustrated in the accompanying drawings, in which:

Figure 1 is a side elevation of a power shovel embodying the novel features of the present invention.

Figure 4:
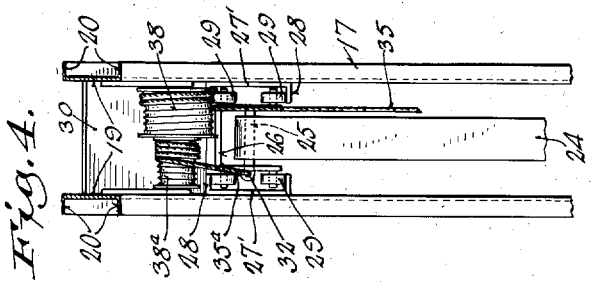
Figure 4 is a front elevation of the parts shown in Figure 2.

Figure 5 is a detail view of a portion of a dipper handle shifting gear of somewhat different form, The shovel selected for illustration includes a wheeled truck 10, provided with a turntable 11, supporting a rotatable platform 12 in the usual manner. A hoisting winch 13 is mounted upon the platform 12. The hoisting winch is driven from any suitable prime mover (not shown) through an appropriate gearing, a portion of which is shown at 14. The hoisting winch includes a main drum 15 and auxiliary drum 16, such, for instance, as are commonly employed as hoisting and dragline drums, respectively, in some well known types of excavators. These drums are mounted for independent rotation, each being controlled by individual clutch and brake mechanisms (not shown) of any standard or approved construction.

A boom 17 is pivotally mounted, as at 18, upon the platform 12. The boom 17 preferably comprises a pair of longitudinal channel bars 19 rigidly secured together in spaced relation with their flanges turned outwardly. The boom is supported in the usual manner by the cable 21 and sheaves 22. A dipper 23 of standard construction is carried by the boom. The dipper is provided with the usual dipper handle 24 rigidly connected therewith and mounted for swinging movement about a pivot 25. The pivot 25 is in the form of a pin or shaft carried by the carriage 26 of any appropriate construction mounted for movement in a suitable guideway 27 secured upon the boom 17. The guideway 27 is made up of a pair of channel bars 27′ extending between and secured to the inner faces of the channel bars 19. The flanges 28 of the bars 27′ are arranged to extend inwardly, thus constituting appropriate tracks or runways for the rollers 29 mounted upon and supporting the carriage 26. In order to increase the strength and rigidity of the channel bars 27′, a cover plate 30 is preferably employed, secured to the upper flanges 28. The construction and arrangement of parts thus far described is old and well known in the art so that a further or more detailed description thereof is deemed unnecessary.

As above pointed out, the present invention has to do with the provision of novel means for effecting and controlling the shifting of the dipper supporting pivot 25 along the guideway 27 to thus change the position of the dipper and dipper handle relative to the boom 17. This is accomplished by the use of novel cable connections between the dipper and dipper handle and the main power unit. This may be accomplished in various ways. In the shovel shown, however, a cable 31, having one end wrapped about the auxiliary drum 16, is connected with the carriage 26, as at 32. This cable is preferably passed over a sheave 33 mounted, as at 34, upon the end of one of the channel bars 27′. The arrangement is such that when the cable 31 is drawn in under the action of the drum 16, the carriage 26, together with the pivot 25 and dipper handle 24, is shifted in one direction, preferably inwardly. Various provisions may be made for opposing the tension in cable 31 so as to shift the dipper handle 24 in the other direction when this cable is paid out. In this instance, the tension in the dipper hoisting cable 35 is utilized for this purpose. The hoisting cable may be arranged in various ways with this end in view. In the shovel shown, however, this cable 35 is connected with the hoisting drum 15 in the usual manner and extends from the drum 15 over a sheave 36, preferably mounted adjacent the outer end of the boom 17, through a padlock sheave 37, connected with the dipper 23, the other end of the cable being wrapped about and anchored upon a drum 38. A second drum $38^a$, preferably of smaller diameter than the drum 38, is secured thereto and connected with the carriage 26 by means of a cable $35^a$, having one end connected to the carriage and the other end wrapped about the drum $38^a$. The cable 35 is thus made to support the dipper and the resulting tension therein is made to oppose the tension in the cable 31 by reason of the connection of cable 35 with the dipper handle through the medium of the drums 38 and $38^a$ and the cable $35^a$.

The cable 35, under the action of the hoisting drum 15, performs the usual functions of raising and lowering the dipper and swinging the dipper handle about the pivot 25. In addition, however, the tension in this cable is made to oppose the tension in the cable 31, so that when the drum 16 is rotated to pay out cable 31, the dipper supporting pivot 25 and dipper are shifted in a direction opposite to that in which they are moved when this cable 31 is drawn in. Thus, in the shovel illustrated, the carriage 26 is always under the control of the drum 16 and the dipper handle pivot 25 may be shifted in either direction along the guideway 27 without requiring rotation of the hoisting drum. Furthermore, the dipper may be raised or lowered at will by the hoisting drum 15 in the usual manner.

To illustrate the operation of the shovel described, assume that the dipper is in the lower initial digging position, such as illustrated in dotted lines in Figure 1, and that the drum 16 is held by its brake against rotation. Upon rotation of the hoisting drum 15 in a clockwise direction, the hoisting cable 35 is drawn in, the dipper is raised, and the dipper handle swung about the pivot 25. As long as the drum 16 is held against rotation, the carriage 26 and pivot 25 are held against outward movement along the guideway 27. As the digging progresses and it is desired to advance the effective swing of the dipper further into the bank, this is accomplished by releasing the drum 16 so as to pay out the cable 31 to the desired extent. This permits the carriage 26 and pivot 25 to shift outwardly along the guideway 27 under the influence of the tension in the cable 35 so that the dipper handle is moved outwardly and the effective swing of the dipper is advanced correspondingly. To return the pivot 25, and hence the dipper handle, to the inner position, it is only necessary to rotate the drum 16 in a clockwise direction so as to draw in the cable 31. This action forces the carriage 26 and pivot 25 inwardly against the influence of the tension in the hoisting cable 35.

When the digging stroke has been completed and the dipper is clear of the bank, the dipper may be readily shifted to an extreme outward position, such as shown in full lines in Figure 1, and such as might be required for dumping purposes, by merely releasing the drum 16. The pivot 25 and dipper are thus advanced in the manner above described. To return the dipper to lower position for a fresh bite it is only necessary to release the hoisting drum 15, and to shift the pivot rearwardly it is only necessary to rotate the drum 16 in a clockwise direction.

In the arrangement shown in Figure 5, the dipper handle 24′ is pivotally supported, as at 25′, on a carriage 26′ reciprocally mounted in a horizontal guideway $27^a$, fixed to the boom 17′. As in the shovel above described, a drum controlled cable 31′ is connected with the carriage 26′ to shift the carriage inwardly along the guideway when this cable is drawn in, and the tension in the hoisting cable 35′ is utilized to shift the carriage outwardly when cable 31′ is paid out. In this instance, however, the hoisting cable passes over a sheave 38′ around a sheave 39 carried by a bracket 40 secured to the carriage and having its end fixed, as at 41, at a fixed point, preferably on the guides 27ᵃ. Thus, the working tension in the hoisting cable 35′ tends to shift the carriage and dipper handle outwardly. The operation of the shovel, equipped in this manner, is substantially the same as that above described.

Figure 2:
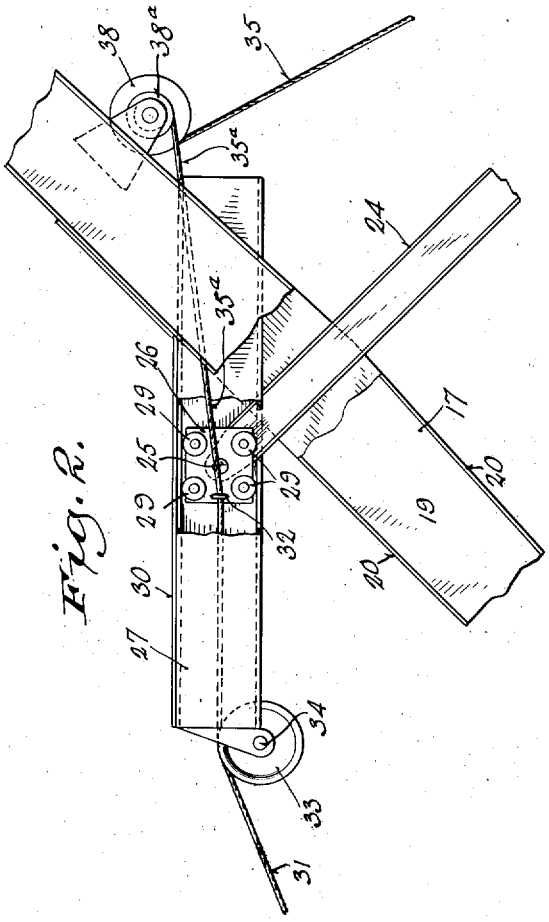
Figure 2 is a detail view on a larger scale of a portion of the dipper shifting gear shown in Figure 1.
Figure 3:
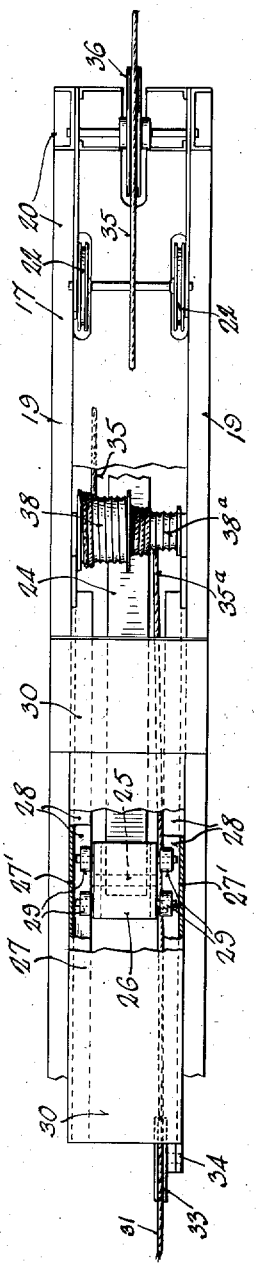
Figure 3 is a plan view of a portion of the boom and associated parts.

Various changes may be made in the embodiments of the invention above described, without departing from or sacrificing any of the advantages of the invention as defined in the following claims. The two alternative methods of utilizing the tension in the hoisting cable to shift the dipper handle outwardly, illustrated in Figures 2 and 5, are characterized by the fact that in each the hoisting cable is associated with the handle at a fixed point thereon to shift the handle, as contrasted with the rolling association furnished by a rack and pinion, or by a rope wound around a drum and anchored at its ends to the handle, or by any other form of rolling association.

I claim:

1. In a power shovel, the combination of a boom, a dipper and dipper handle, a pivotal support therefor movable relative to said boom, a hoisting cable connected adjacent the free end of said handle to swing said handle and adjacent the pivotal support to shift said support, and means for controlling the position of said support relative to the boom.

2. In a power shovel, the combination of a boom, a dipper and dipper handle, a pivotal support therefor movable relative to said boom, a hoisting cable connected adjacent the free end of said handle to swing said handle and adjacent the pivotal support to shift said support, and means including a line of cable associated with said support for controlling the position of said support.

3. In a power shovel the combination with excavating means including a dipper and dipper handle and a pivotal support for said handle movable substantially horizontally, of means actuated by the weight of said excavating means to move said support in one direction only in any position of said support, and means for controlling such movement and for moving said support in the other direction.

4. A power shovel having a dipper and dipper handle, a pivotal shiftable support for said handle, a hoisting gear operable to swing said dipper about said support and constituting the sole actuating means for shifting said support in one direction only, in any position thereof, and means for controlling the position of said support.

5. A power shovel having a dipper and dipper handle, a pivotal shiftable support for said handle, a hoisting gear operable to swing said dipper about said support and constituting the sole actuating means for shifting said support in one direction only, in any position thereof, and means including a line of cable for controlling the position of said support.

6. A power shovel having a dipper and dipper handle, a pivotal shiftable support for said handle, means including a line of cable associated with said dipper and dipper handle adjacent said support for shifting said support in one direction only when said cable is drawn in, and a dipper hoisting cable responsive to a release of tension in said cable for shifting said support in the other direction when said first named cable is paid out.

7. A power shovel having a dipper and dipper handle, a pivotal shiftable support for said handle, means including a line of cable for shifting said support in one direction when said line of cable is drawn in, and means including a second line of cable operable by the weight of the dipper in any position of said support for shifting said support in another direction only when said first named line of cable is paid out.

8. A power shovel having a dipper and dipper handle, a pivotal shiftable support for said handle, means including a line of cable for shifting said support in one direction, and means including a hoisting cable for raising and lowering said dipper and for shifting said support in another direction only, independently of whether said dipper is being raised or lowered.

9. A power shovel having a hoisting drum and an auxiliary drum, a dipper and dipper handle, a pivotal shiftable support for said handle, a cable associated with said dipper handle adjacent said support and adjacent said dipper and connected with said hoisting drum for raising and lowering said dipper and for shifting said support, and a cable connected with said auxiliary drum and with said support for controlling the position of said support.

10. A power shovel having a hoisting drum and an auxiliary drum, a dipper and dipper handle, a pivotal shiftable support for said handle, a line of cable connected with said hoisting drum and with said handle adjacent the dipper and support for shifting said support in one direction, and a line of cable connected with said auxiliary drum for shifting said support in another direction.

11. A power shovel having a hoisting drum and an auxiliary drum, a dipper and dipper handle, a pivotal shiftable support for said handle, a line of cable connected with said hoisting drum and with said handle adjacent the dipper and support for shifting said support, and a line of cable associated with said auxiliary drum for controlling the position of said support.

12. A power shovel having a hoisting drum, a dipper and dipper handle, a pivotal shiftable support for said handle, a line of cable connected with said hoisting drum and with said handle adjacent the dipper and support for shifting said support, and means for controlling the position of said support.

13. A power shovel having a boom, a dipper and dipper handle mounted thereon for swinging and shifting movements, two drums mounted on said boom for rotation in unison, a dipper hoisting cable connected with one of said drums, means including a cable connected with the other of said drums and associated with said dipper handle through which said handle is biased toward shifting movement in one direction by the tension in said hoisting cable, and means for controlling such shifting movement and for shifting said handle in another direction.

14. A power shovel having a boom, a dipper and dipper handle mounted thereon for swinging and shifting movements, means including a cable for shifting said handle in one direction, means including a cable for shifting said handle in another direction, a dipper hoisting cable, and a drum having portions of different diameters connected respectively with said hoisting cable and one of said other cables whereby the working tension in said hoisting cable is utilized to shift said dipper handle.

15. A power shovel having a boom, two interconnected drums of different diameters mounted thereon, a dipper and dipper handle mounted on said boom for swinging and shifting movements, a dipper hoisting cable connected with the larger of said drums, a second cable connected with the smaller of said drums and associated with said dipper handle to shift said handle outwardly, and means including a third cable associated with said dipper handle for shifting said handle inwardly.

16. In a power shovel the combination of an inclined boom, a dipper and dipper handle, a pivotal support therefor movable transversely of said boom, a dipper hoisting cable for swinging said dipper about said support and for moving said support in one direction only, independently of the angular relation between said dipper handle and boom, and means for controlling such movement and for moving said support in the other direction.

17. In a power shovel the combination of a boom, a dipper and dipper handle, a pivotal support therefor movable relative to said boom, means including a dipper hoisting cable for moving said support in one direction only, and means operable to move said support in the other direction only but releasable to permit movement of said support under the influence of said hoisting cable.

18. In a power shovel the combination of an inclined boom, a dipper and dipper handle, a pivotal support for said handle mounted on said boom for substantially horizontal movement, a dipper hoisting cable, connections between said cable and support for moving said support in one direction only, and means including another cable for shifting said support in another direction.

19. In a power shovel the combination of an inclined boom, a dipper and dipper handle, a pivotal support for said handle movable substantially horizontally, a dipper hoisting cable, connections between said cable and said support for moving said support outwardly only, and means for controlling such movement and for moving said support inwardly.

20. In a power shovel the combination of a boom, a dipper and dipper handle mounted thereon for swinging and shifting movements, a dipper hoisting cable operatively associated with the outer end of said handle for raising and lowering said dipper, and with the inner end of said handle at a fixed point thereon for shifting said handle outwardly only, and distinct means for controlling such shifting movement and for shifting said handle inwardly.

21. In a power shovel the combination of a boom, a dipper and dipper handle mounted thereon for swinging and shifting movements, a dipper hoisting cable operatively associated with said dipper and dipper handle at a fixed point thereon to swing said dipper and dipper handle and at another fixed point thereon to shift said dipper and dipper handle in one direction only, and a second cable having an operative association with said dipper and dipper handle, independent of the shifting association of the hoisting cable, for controlling such shifting movement and for shifting said dipper and dipper handle in the opposite direction.

22. In a power shovel the combination of a boom, a dipper and dipper handle mounted thereon for swinging and shifting movements, a dipper hoisting cable operatively associated with said dipper and dipper handle at a fixed point thereon to swing said dipper and dipper handle and at another fixed point thereon to shift said dipper and dipper handle outwardly only, and a second cable having an operative association with said dipper and dipper handle, independent of the shifting association of the hoisting cable, for controlling such shifting movement and for shifting said dipper and dipper handle inwardly.

23. In a power shovel the combination of a boom, a dipper and dipper handle mounted thereon, a hoisting cable passing over said boom and associated with the inner end of said dipper handle to shift said handle outwardly, and an independently operated cable having an operative association with said dipper and dipper handle, independent of the shifting association of the hoisting cable, for controlling such shifting movement and for shifting said dipper and dipper handle inwardly.

24. In a power shovel the combination of a boom, a dipper and dipper handle mounted thereon for swinging and shifting movements, hoisting means associated with the outer end of said dipper handle for raising and lowering said dipper, said means including a line of cable pulling on the inner end of said dipper handle to maintain an outward crowd thereon, and means including a second line of cable pulling directly on said dipper handle to effect and control the shifting movement of said handle.

25. In a power shovel the combination of a boom, a dipper and dipper handle mounted thereon for swinging and shifting movements, a hoisting cable pulling upwardly on the outer portion of said handle to support and operate the dipper and pulling outwardly on the inner end of said handle to maintain an outward crowd thereon, and means including a separately operated cable acting through means independent of those through which the hoisting cable exerts its outward pull, to oppose the outward pull of said hoisting cable to control the shifting of said handle.

26. A power shovel having a boom, a dipper and dipper handle mounted thereon for swinging and shifting movements, two drums mounted on said boom for rotation in unison, a dipper hoisting cable connected with one of said drums, means associated with the other of said drums and with said dipper handle through which said handle is biased toward shifting movement in one direction by the tension in said hoisting cable, and means for controlling such shifting movement and for shifting said handle in another direction.

In witness whereof, I hereunto subscribe my name this 2nd day of October, 1924.

WALTER FERRIS.